United States Patent [19]

Owens

[11] 4,201,112
[45] May 6, 1980

[54] ICE CREAM DISPENSER

[76] Inventor: James D. Owens, P.O. Box 14943, Orlando, Fla. 32857

[21] Appl. No.: 925,236

[22] Filed: Jul. 17, 1978

[51] Int. Cl.² .............................................. B26D 4/42
[52] U.S. Cl. ........................................ 83/355; 83/170; 83/356.3; 83/417; 83/423; 83/437; 83/648
[58] Field of Search .................. 83/356.3, 355, 417, 83/437, 170, 648, 423

[56] References Cited

U.S. PATENT DOCUMENTS

| | | | |
|---|---|---|---|
| 1,319,371 | 10/1919 | Bauer | 83/356.3 |
| 1,803,769 | 5/1931 | Rohland | 83/356.3 |
| 2,145,965 | 2/1939 | Beatty | 83/437 X |
| 2,148,451 | 2/1939 | Elliott, Sr. | 83/437 X |
| 2,386,730 | 10/1945 | Weiner | 83/355 X |
| 2,737,721 | 3/1956 | Hart | 83/437 |
| 3,774,487 | 11/1973 | Topliffe | 83/437 X |

Primary Examiner—Frank T. Yost
Attorney, Agent, or Firm—Duckworth, Hobby, Allen & Pettis

[57] ABSTRACT

An ice cream dispensing apparatus allows the dispensing of half-gallon boxes of ice cream purchased at a supermarket. The dispenser is mounted in the home freezer portion of a refrigerator and each block of ice cream is placed in a special canister. The dispenser may be opened from the front, the ice cream inserted, and by pressing a switch, the ice cream is dispensed into a bowl or cone. The ice cream in the dispenser is pushed from one end while being cut from the other. The pushing mechanism and the cutting mechanism are driven by the same motor. The unit is easily removable from the freezer for cleaning.

19 Claims, 2 Drawing Figures ically sli into the freezer compartment or removed for

ICE CREAM DISPENSER

BACKGROUND OF THE INVENTION

The present invention relates to ice cream dispensers, and especially to an ice cream dispenser for dispensing portions from a block of packaged ice cream.

In the past, it has been common to provide a large variety of refrigerated mechanisms having dispensers mounted thereon. Typical of the prior art are ice cream freezers, in which ice cream is made in the freezer portion of a refrigerator or in a separate freezer and has a dispenser for dispensing the ice cream in a soft flowing state. Typical ice cream mixers and dispensers may be seen in U.S. Pat. No. 2,125,693 for a dessert freezer, which includes a power driven agitator equipped freezing unit for mixing ice cream, and also includes means for dispensing the ice cream. Similar units may be seen in U.S. Pat. No. 2,416,326, for an ice cream freezer which produces ice cream for table use by agitating the ingredients in the freezer, and in U.S. Pat. No. 2,265,867 an ice cream freezer is provided with its own refrigeration coils for making ice cream without the use of ice. U.S. Pat. No. 2,209,979 illustrates a different type of apparatus for serving frozen confection products directly from a freezer. Other devices that will attach to existing freezer units include ice making machines which sometimes dispense and crush the ice made in the freezer. A typical refrigerator ice service may be seen in U.S. Pat. No. 3,640,088 and in U.S. Pat. No. 2,990,864, for a refrigerated food processing meat chopper or grinder which includes a refrigerated portion for grinding and dispensing meat or the like.

The present invention, on the other hand, mounts in a household freezer, similar to an ice making machine, but uses ice cream purchased in a supermarket or other store in half-gallon blocks which may be inserted into separate canisters so that when the ice cream is desired, it may be quickly slid into the ice cream dispenser mounted in the freezer, and an actuating button pushed to deliver ice cream to a bowl. The ice cream delivery ceases when the actuating switch is released, thereby allowing the user to accurately determine the portion that he desires, and providing him with ice cream which is cut into smaller pieces from the large block of ice cream.

SUMMARY OF THE INVENTION

The present invention relates to an ice cream dispenser attachment for a home refrigerator or freezer which has a container which is removably mounted to the inside of the freezer. The container has a hinged front cover having cutting blades mounted therein, which allows a half-gallon canister of ice cream to be slid into the container and the hinged cover closed. The dispenser may be operated by a switch which actuates a motor which in turn drives a pushing mechanism to push the ice cream towards the cover and which motor simultaneously drives the blades located in the hinged cover for cutting off slices of ice cream from the block of ice cream and dispensing the ice cream beneath the cover into a bowl held by the user. The ice cream pushing mechanism utilizes a scissor type lattice network which is driven by a rotating screw operating in a nut attached to the lattice work, while the cutting blades are guillotine blades mounted on endless flexible blade supports rotating on sprockets.

BRIEF DESCRIPTION OF THE DRAWINGS

Other objects, features and advantages of the present invention will be apparent from the written description and the drawings, in which.

DESCRIPTION OF THE PREFERRED EMBODIMENT

Figure 1:
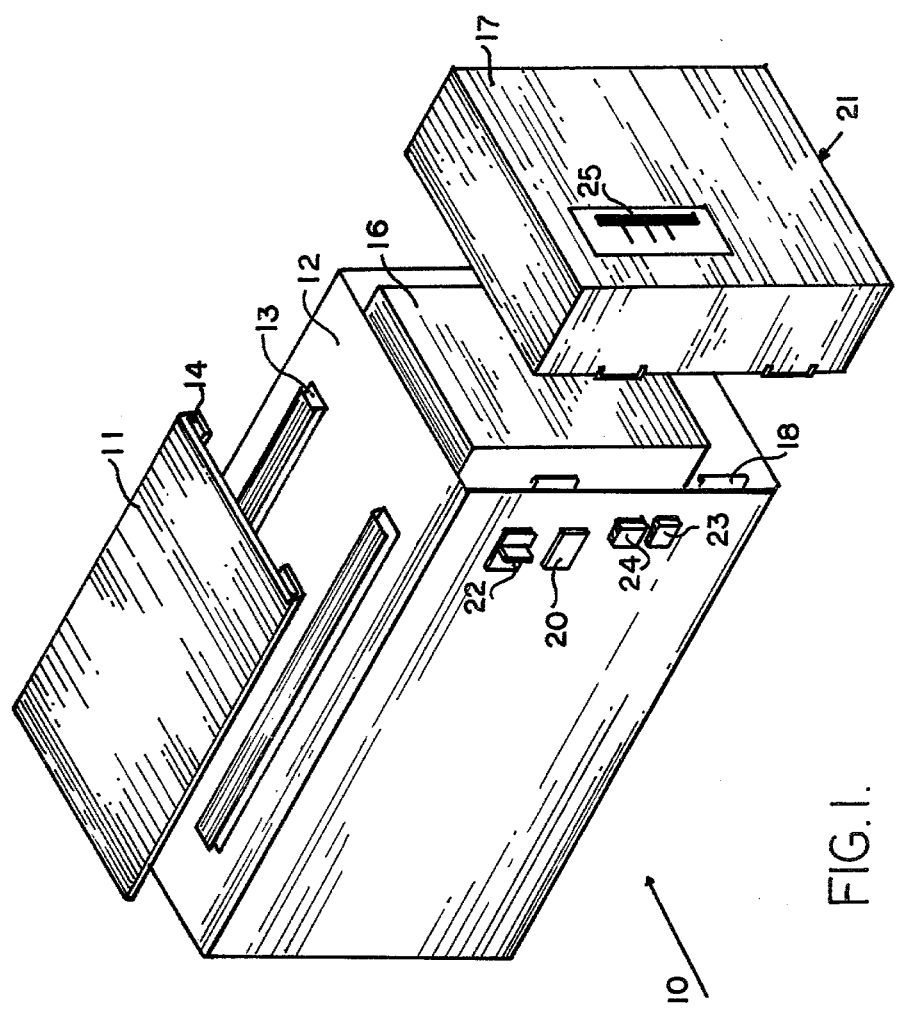
FIG. 1 is an exploded perspective view of an ice cream dispenser attachment for a home freezer.

Referring now to the drawings, an ice cream dispenser 10 for mounting to the inside of the home freezer or a freezer portion of a refrigerator is shown having a suspension attaching bracket 11 for mounting to the inside of the freezer, such as to the roof portion of the freezer compartment. Bracket 11 allows a container 12 to be attached thereto with the grooved tracks 13 which slides in the supporting matching tracks 14 of the suspension bracket 11. Thus, the container 12 can be rapidly slid into the freezer compartment or removed for cleaning, as desired, and has an electrical connector 15 which connects to the matching plug in the rear of the freezer when the container is slid onto the bracket 11. Once attached in the freezer, a canister 16 of ice cream may be slid into the container 12 through the hinged cover 17 which is hinged by the hinges 18. When the hinge cover 17 is closed, a switch 20 may be actuated to dispense ice cream through the bottom 21 of the hinged cover 17 until the switch 20 is released. The ice cream is dispensed in small slices so that the portion desired can be accurately controlled. In addition to the on/off switch, a mode switch 22 may be provided as well as an empty indicator light 23, which comes on when the canister 17 mounted in the container 12 is empty of ice cream. A load indicator light 24 indicates that the ice cream is in position to be dispensed. A thermometer 25 mounted in the front cover 17 indicates the temperature maintained in the dispenser 10 to assure that the ice cream is maintained at the right temperature while in the freezer.

Figure 2:
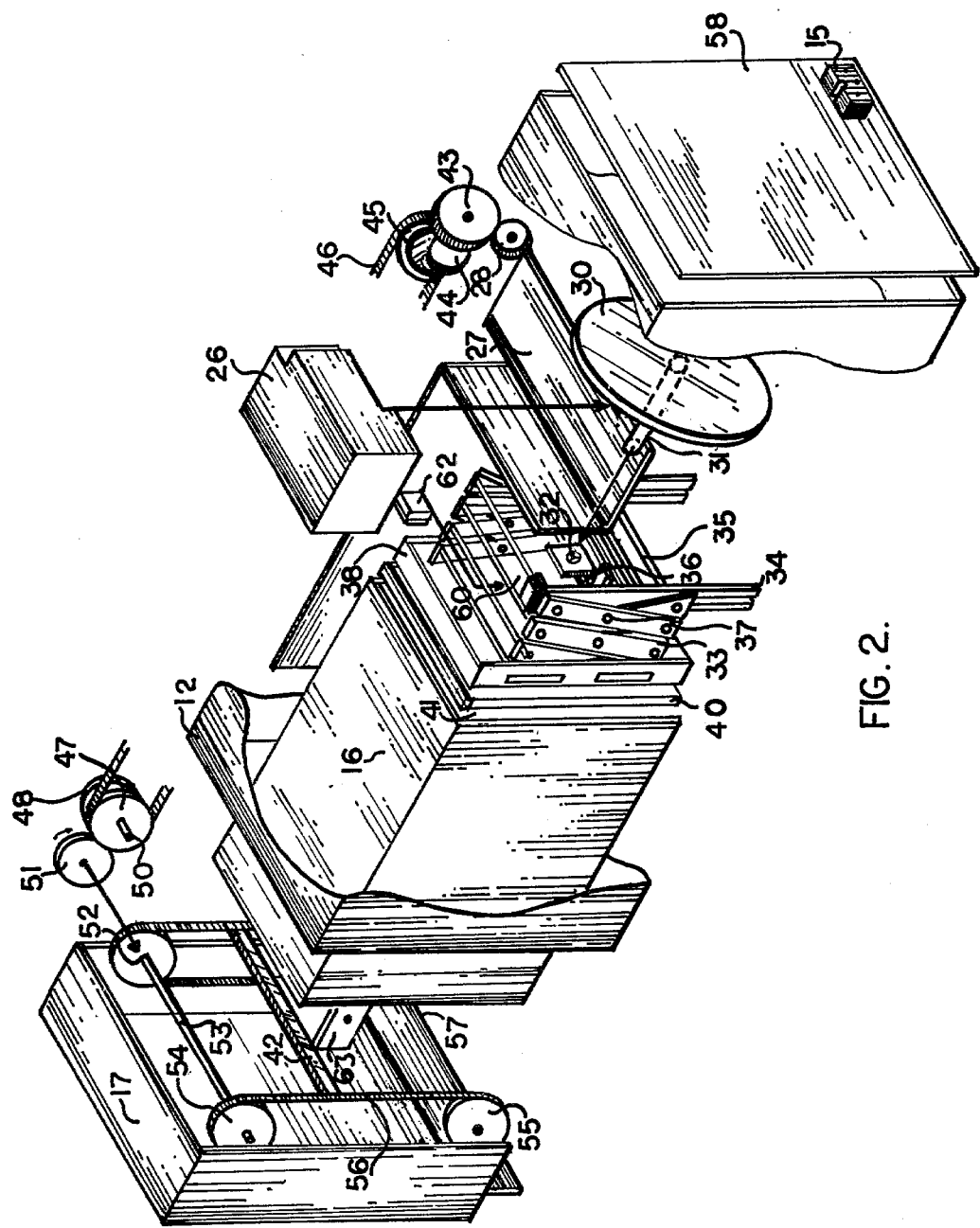
FIG. 2 is a fragmentary exploded perspective view of the ice cream dispenser of FIG. 1 showing the operating mechanism of the dispenser.

FIG. 2 more clearly shows the operation of the dispenser which is operated by a motor 26 mounted to a partition and motor mount platform 27 and which has a motor shaft connected to a drive gear 28 which engages the drive gear 30. The gear 30 has a central threaded shaft 31 mounted thereto which rotates when the gear 30 rotates and which shaft is threaded into a ring nut 32 at all times for driving a scissors mechanism 33 forward or backward when the motor 26 is actuated in a forward or reverse direction. The scissors mechanism 33 has a pair of supports 34 mounted onto the scissors mechanism shaft 35 to support one end of the scissors mechanism in a fixed position, while the ring nut 32 is attached to a center shaft 36 mounted to a center point 37 of the rearmost lattice work of the scissors mechanism for pushing the scissors mechanism at that point, thereby extending the entire lattice work of the scissors mechanism. The front of the scissor mechanism has a frame 38 mounted thereto which pushes against a plunger plate 40, which in turn drives a block of ice cream 41 located in the canister 16 towards the front of the dispenser where it engages one or more rotating cutting blades 42. The motor 26 drives the gears 43 and 44 simultaneously, and gear 43 drives a half tooth drive gear 28, which drives a gear 30. Gear 44 engages the rear sprocket 45 and drives a sprocket chain 46. This chain in turn drives a front sprocket 47 mounted to the side of the container 12 which has connected thereto a transfer gear 48 with a shaft 50. The transfer gear 48 engages a front drive gear 51 which is fixedly attached to the blade drive sprocket 52 and is connected by a shaft 53 to a second drive sprocket 54. The shaft 53 is mounted to the side of the front cover 17 and a pair of bottom blade drive sprockets 55 are also mounted to the cover 17 and the sprockets support a pair of flexible vertically extending ladder chains 56 having a plurality of cutting blades 42 connected thereto. Inasmuch as the chains 56 are endless chains riding on the sprockets 52 and 54 on one end and a pair of sprockets 55 on the other, the blades 42 rotate continuously, slicing off small portions of the end of the ice cream, which is being simultaneously pushed by the motor 26 driving the gear 30 to push the scissors network to push the ice cream into the cutting blades 42. Thus, the actuation of one switch drives the ice cream forward into the cutting blades, which blades may be placed at a slight angle to shave off the end portions of the ice cream into a bowl, or the like, held by the user. The ice cream falls through a bottom chute 57 of the front cover 17.

The motor 26 is connected to an electrical source through the plug 15 mounted to the back panel 58 of the container 12. The scissors mechanism 33 has a limit switch 60 mounted thereto which indicates when the scissors mechanism is fully extended, thereby actuating the empty indicator light 23 and disengaging the motor 26. In addition, a limit switch 62 actuates the ready to dispense indication light 23. A bracket 63 engages the front cover 17 to hold the cover closed. Actuation of the device is by the switch 22 which activates the motor. Switch 22 can change the gear speed and direction between forward, fast forward and reverse directions. Turning it on in a forward direction drives the scissors mechanism 33 by the gear 30 driving the screw 31 pushing any ice cream therein forward. Gear 44 and sprocket 45 are actuated to drive the sprocket 47, gear 48, and gear 51 to drive the sprockets 52 and 54 to drive the blades for shaving off the ice cream. This mechanism not only advantageously drives the pushing mechanism and the cutting mechanism, it allows the front cover 17 to be opened without interfering with the mechanism, inasmuch as the drive gear 51 merely disengages from the drive gear 48 when the front cover is swung on the hinges 18, and since the gears 51, 52, 54 and 55 are not moved until the cover is closed again, the gears remain positioned to immediately mesh when the front cover is closed. This also allows for the easy removal of the front cover by disengaging the front cover 17 from the hinges so that the blades may be cleaned up as desired. In addition, the ease with which the container 12 can be slid from the bracket 11 and unplugged from the female part of the plug 15 allows the entire mechanism to be cleaned, which is facilitated by the removable back plunger plate 40.

Other embodiments are contemplated as being within the scope of the invention, but it should be clear that the present invention would be made of stainless steel and polymer materials which would not be subject to corrosion from the cold and moisture. For instance, canister 16 can be an inexpensive polymer container of which the owner could have several with a different flavor of ice cream inserted into each one so that he can rapidly grasp one container, remove it and insert another if he desired a different flavor of ice cream. The container can be open at each end with a sliding back plate in one end to push the ice cream and a removable plastic lid on the other so that the ice cream can be safely stored when not in the dispenser. In addition, the canister 16 would keep the ice cream from getting messy, and could be easily cleaned when the canister of ice cream was used up. The ice cream can also be sold in canisters ready to insert in the dispenser. Accordingly, the present invention is not to be construed as limited to the particular forms shown, which are to be considered illustrative rather than restrictive.

I claim:

1. An ice cream dispenser for a home freezer, or the like, comprising in combination:
   container means for holding a block of ice cream therein said container means having a front cover thereon;
   attachment means for attaching said container to the inside of a freezer;
   delivery means for pushing a block of ice cream in said container upon actuation of said delivery means; and
   cutting means for cutting ice cream from one end of a block of ice cream located in said container means front cover, whereby predetermined portions of ice cream are delivered from a block of ice cream inserted in said ice cream dispenser upon actuation thereof.

2. The apparatus in accordance with claim 1, in which an electric motor is mounted to said container means and operatively connected to drive said delivery means and said cutting means.

3. The apparatus in accordance with claim 2, in which a switch operates said electric motor for simultaneously operating said delivery means and cutting means.

4. The apparatus in accordance with claim 3, in which said container means front cover is hinged to be swung open for inserting a block of ice cream.

5. The apparatus in accordance with claim 3, in which said front cover is removably mounted to said container for removing said front cover and cutting means therefrom.

6. The apparatus in accordance with claim 5, in which said cutting means is mounted to endless flexible members rotating on drive sprockets mounted on shafts in said front cover.

7. The apparatus in accordance with claim 6, in which said cutting means is a guillotine type cutting blades.

8. The apparatus in accordance with claim 7, in which said delivery means includes a scissors type mechanism for pushing the block of ice cream when actuated by said electric motor.

9. The apparatus in accordance with claim 8, in which said delivery means scissors mechanism is supported at one end and has an internally threaded nut attached thereto, and is driven by a drive gear having a threaded shaft engaging said internally threaded nut for moving said nut for extending and retracting said scissors mechanism.

10. The apparatus in accordance with claim 9, in which said delivery means drive gear is operatively connected to said electric motor through a gear coupling.

11. The apparatus in accordance with claim 10, in which said scissors mechanism has supports mounted at one end supporting said scissors mechanism, while allowing said scissors mechanism to be extended and retracted.

12. The apparatus in accordance with claim 11, in which said scissors mechanism has a pushing plate attached to one end to be extended with said scissors mechanism.

13. The apparatus in accordance with claim 12, in which said electric motor is coupled through gears to a sprocket drive which is operatively connected to said cutting blade for actuating said cutting blade when said electric motor is actuated.

14. The apparatus in accordance with claim 13, in which said sprocket for driving said cutting blade engages a gear which is connected to the drive sprockets for said cutting blade.

15. The apparatus in accordance with claim 14, in which said attachment means includes a bracket attachable to the inside of a freezer for a slidable connection with a track mounted on said container means.

16. The apparatus in accordance with claim 15, in which said cover for said container means has a thermometer mounted therein for indicating the temperature inside said container.

17. The apparatus in accordance with claim 16 in which a microswitch is mounted to said scissors mechanism to indicate when said scissors mechanism has extended a predetermined distance for actuating a light to indicate when said container is empty.

18. The apparatus in accordance with claim 17, in which a microswitch is mounted in said container to actuate a light indicating when a block of ice cream has been inserted into said container.

19. The apparatus in accordance with claim 18, in which said container has a removable canister, said canister being adapted to hold a block of ice cream in said container or separate therefrom.

* * * * *